(12) United States Patent
Telfer et al.

(10) Patent No.: US 10,969,604 B2
(45) Date of Patent: Apr. 6, 2021

(54) THREE DIMENSIONAL DISPLAY APPARATUS

(71) Applicant: E Ink Corporation, Billerica, MA (US)

(72) Inventors: Stephen J. Telfer, Arlington, MA (US); Stephen Bull, Windham, NH (US); John L. Chuma, Westborough, MA (US); George G. Harris, Woburn, MA (US); Kosta Ladavac, Somerville, MA (US); Allan Sadun, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/565,785

(22) Filed: Sep. 10, 2019

(65) Prior Publication Data

US 2020/0096779 A1  Mar. 26, 2020

Related U.S. Application Data

(60) Provisional application No. 62/809,939, filed on Feb. 25, 2019, provisional application No. 62/733,785, filed on Sep. 20, 2018.

(51) Int. Cl.
*G02B 30/36* (2020.01)
*G09G 3/34* (2006.01)
(Continued)

(52) U.S. Cl.
CPC ......... *G02B 30/36* (2020.01); *G02B 6/12002* (2013.01); *G02F 1/167* (2013.01); *G09G 3/344* (2013.01)

(58) Field of Classification Search
CPC ..... G02B 30/36; G02B 6/12002; G02F 1/167; G09G 3/344
See application file for complete search history.

(56) References Cited

U.S. PATENT DOCUMENTS 5,812,186 A * 9/1998 Telfer .................. G02F 1/011
                                                    348/54
6,064,784 A    5/2000 Whitehead et al.
(Continued)

FOREIGN PATENT DOCUMENTS

CN    104597565 A  *  5/2015
CN    104597565 A     5/2015
(Continued)

OTHER PUBLICATIONS

Korean Intellectual Property Office, PCT/US2019/050320, International Search Report and Written Opinion, Jan. 13, 2020.
(Continued)

*Primary Examiner* — Kenneth B Lee, Jr.
(74) *Attorney, Agent, or Firm* — Ioannis Constantinides

(57) ABSTRACT

An apparatus for a three-dimensional display is disclosed that includes a waveguide having a pair of opposed faces configured to propagate radiation along a length of the waveguide between the faces, a radiation source optically coupled to the waveguide and configured to transmit the radiation to the waveguide, at least one prismatic element having a face optically coupled to at least one of the faces of the waveguide, and a layer of image modulating material optically coupled to at least one of the faces of the waveguide. The image modulating material may be optically coupled to an area of at least one of the faces of the waveguide, at least a portion of the area being located outside a perimeter of a face of the prismatic element optically coupled to at least one of the faces of the waveguide. The image modulating material may also be optically coupled to at least one of the faces of the waveguide, such that the waveguide is between the layer of image modulating material and the at least one prismatic element.

21 Claims, 18 Drawing Sheets

(51) Int. Cl.
*G02F 1/167* (2019.01)
*G02B 6/12* (2006.01)

(56) References Cited

U.S. PATENT DOCUMENTS

| | | | |
|---|---|---|---|
| 6,266,473 B1 | 7/2001 | Saccomanno et al. |
| 6,301,038 B1 | 10/2001 | Fitzmaurice et al. |
| 6,866,760 B2 | 3/2005 | Paolini Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,961,167 B2 | 11/2005 | Prins et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,236,291 B2 | 6/2007 | Kaga et al. |
| 7,321,459 B2 | 1/2008 | Masuda et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,535,624 B2 | 5/2009 | Amundson et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 8,786,643 B2 | 7/2014 | Seetzen |
| 8,995,047 B2 | 3/2015 | Chu |
| 9,042,014 B1 | 5/2015 | Sethna et al. |
| 9,179,436 B1 | 11/2015 | Dhammawat et al. |
| 9,279,906 B2 | 3/2016 | Kang |
| 9,651,729 B2 | 5/2017 | Nichol et al. |
| 10,209,530 B2 | 2/2019 | Telfer et al. |
| 2017/0160556 A1* | 6/2017 | Telfer ............... G02F 1/167 |
| 2018/0246330 A1 | 8/2018 | Fattal |

FOREIGN PATENT DOCUMENTS

| | | |
|---|---|---|
| JP | 2005283819 A | 10/2015 |
| WO | 2008032248 A1 | 3/2008 |

OTHER PUBLICATIONS

Wood, D., "An Electrochromic Renaissance?" Information Display, 18(3), 24 (Mar. 2002).
O'Regan, B. et al., "A Low Cost, High-efficiency Solar Cell Based on Dye-sensitized colloidal TiO2 Films", Nature, vol. 353, pp. 737-740 (Oct. 24, 1991).
Bach, Udo. et al., "Nanomaterials-Based Electrochromics for Paper-Quality Displays", Adv. Mater, vol. 14, No. 11, pp. 845-848, (Jun. 5, 2002).
Hayes, R.A. et al., "Video-Speed Electronic Paper Based on Electrowetting", Nature, vol. 425, No. 25, pp. 383-385 (Sep. 2003).
Kitamura, T. et al., "Electrical toner movement for electronic paper-like display", Asia Display/IDW '01, pp. 1517-1520, Paper HCS1-1 (2001).
Yamaguchi, Y. et al., "Toner display using insulative particles charged triboelectrically", Asia Display/IDW '01, pp. 1729-1730, Paper AMD4-4 (2001).

* cited by examiner

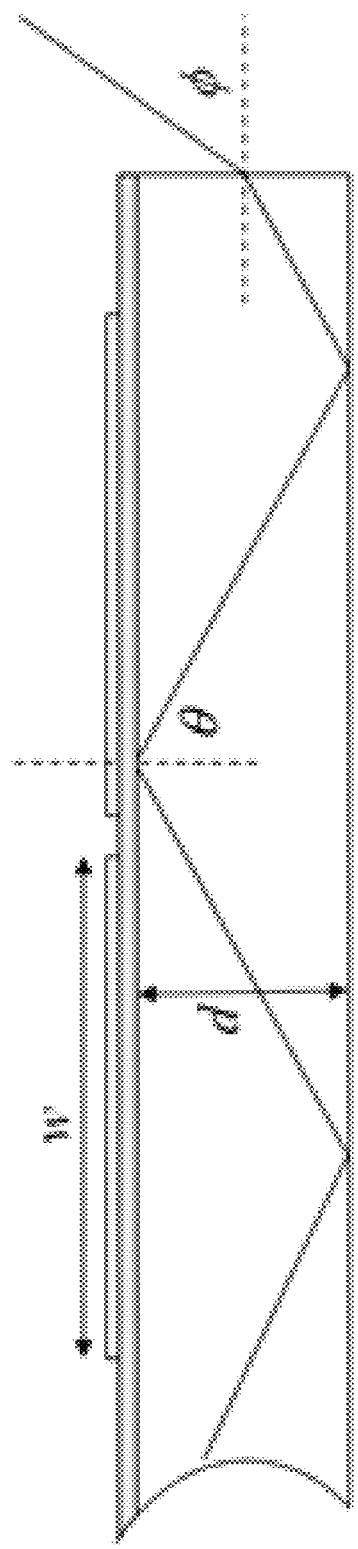

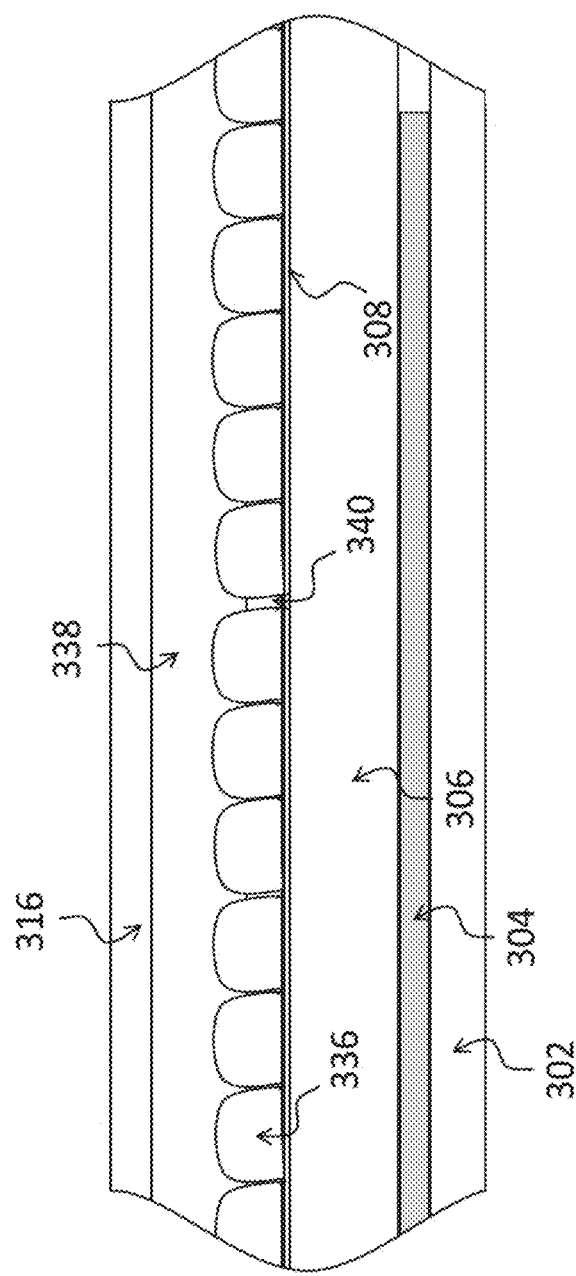

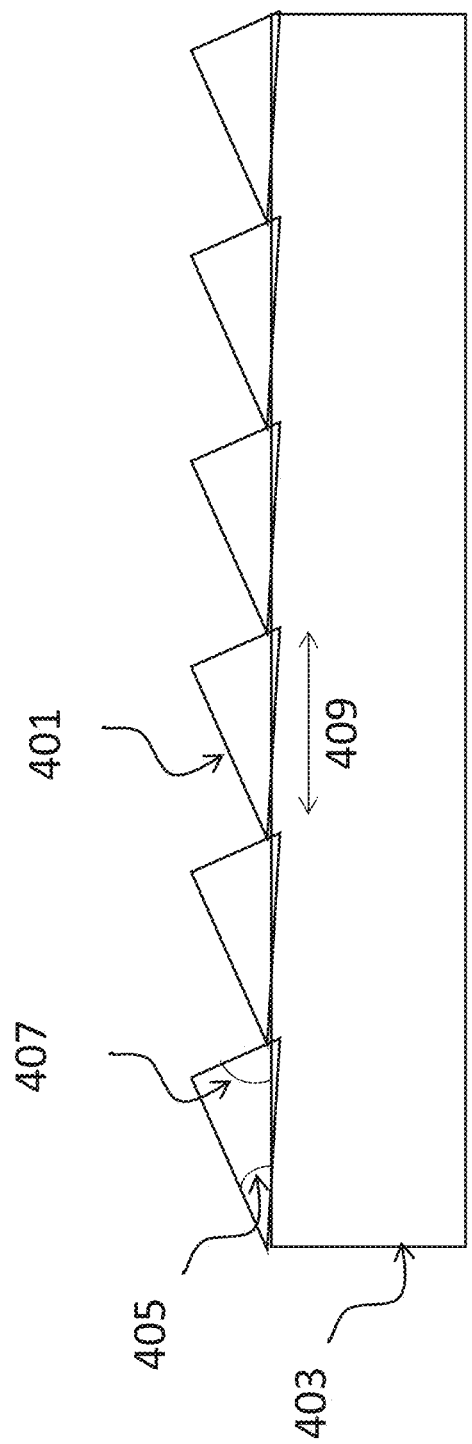

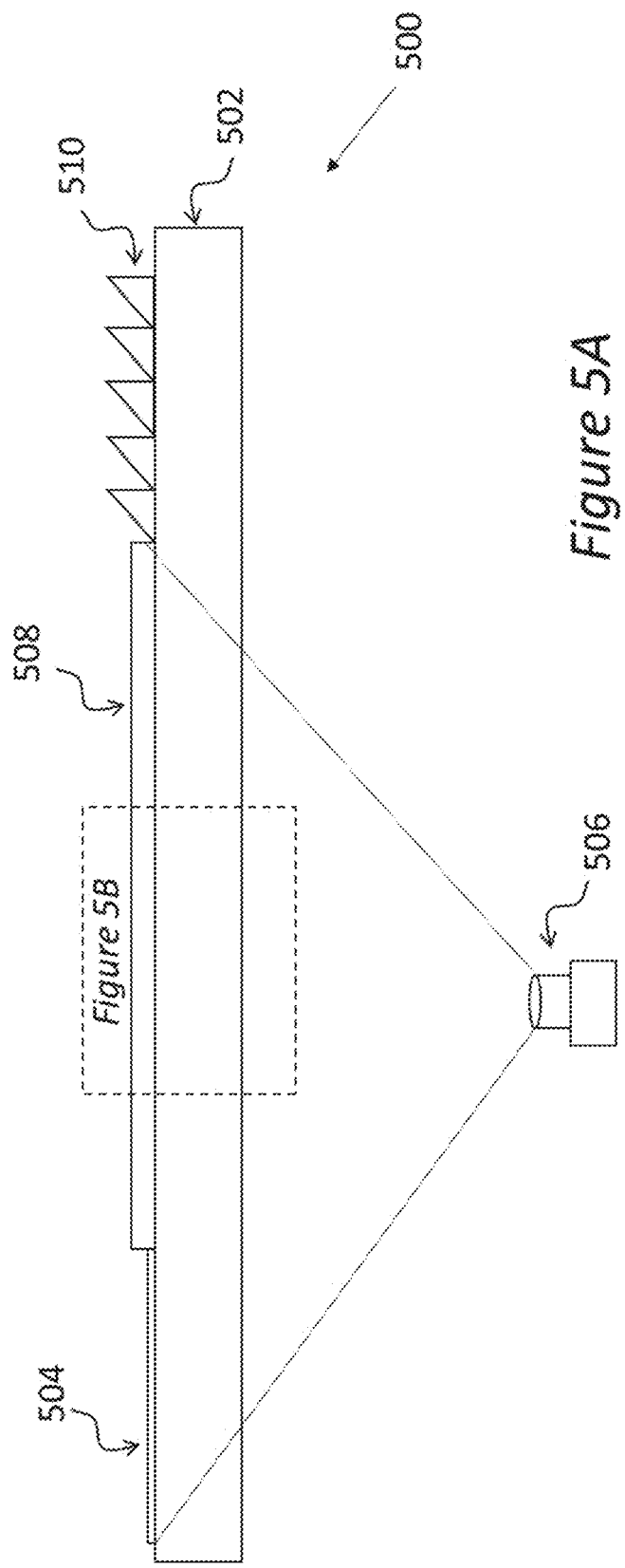

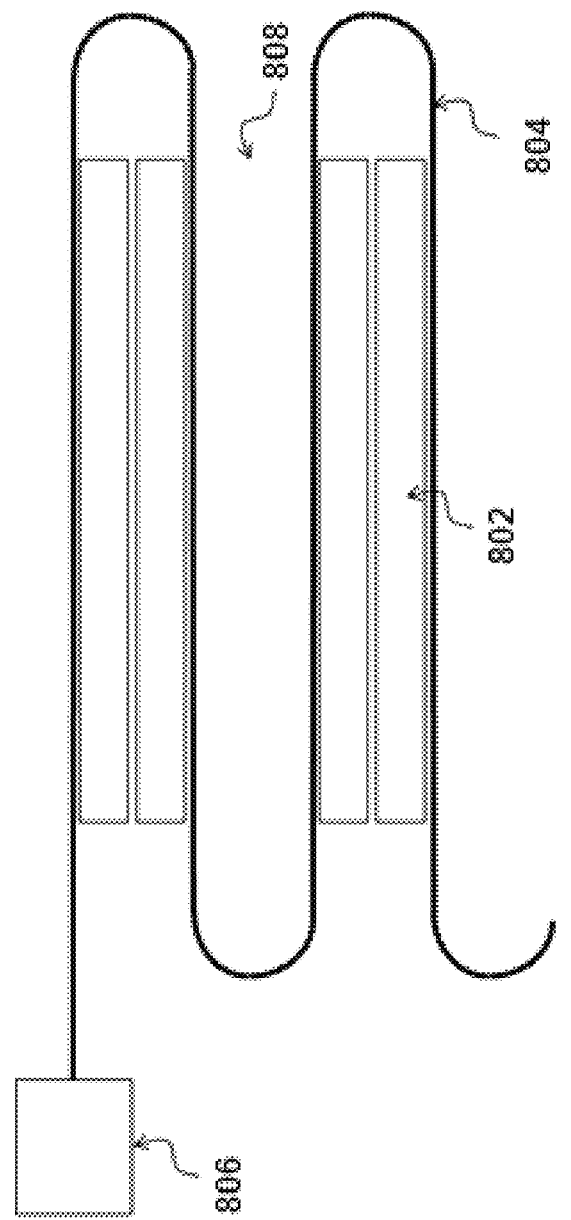

THREE DIMENSIONAL DISPLAY APPARATUS

CROSS-REFERENCE TO RELATED APPLICATIONS

This application claims the benefit of and priority to U.S. Provisional Patent Application having Ser. No. 62/733,785, filed on Sep. 20, 2018, and U.S. Provisional Patent Application having Ser. No. 62/809,939, filed on Feb. 25, 2019, the contents of which are incorporated by reference herein in their entireties.

BACKGROUND OF INVENTION

This invention relates to three-dimensional displays; more specifically, displays using the modulation of light traveling in a waveguide.

The use of two-dimensional images to display three-dimensional Objects suffers from various disadvantages. For example, many people have trouble envisioning the final appearance of a three-dimensional object from a set of two-dimensional images, and it may be difficult to appreciate the relative position of objects or awkward sightlines from two-dimensional images. Hence, it is useful to display three-dimensional objects within an image in such a way that the spatial relationships between the various components of the image are apparent.

Many types of three-dimensional displays are known, but all have limitations. As a result, three-dimensional displays providing volumetric images with true parallax are the subject of active research. Such displays (sometimes referred to as "light field" displays) do not require the viewer to wear special glasses and provide much more information than is available in a more conventional stereoscopic three-dimensional display.

One technique that may be used to provide such a volumetric display uses modulation of light propagating in a waveguide, for example using liquid crystal (LCD) technology as described, for example, in U.S. Pat. No. 5,812,186. However, liquid crystalline materials may introduce an angular dependence of light modulation which can limit the performance of such three-dimensional displays.

U. S. Patent Application No. 20170160556 describes the use of electrophoretic or electrowetting technology to frustrate total internal reflection in a waveguide so as to provide a slice of a three-dimensional image. As described therein, a stack comprising multiple waveguides may be used to provide a complete image.

The design of such three-dimensional displays may be simplified by utilizing only a single waveguide. For certain applications, a three-dimensional display that uses a single waveguide may be advantageous because such a design allows for lower manufacturing cost and a more compact display. A prior art example of a three-dimensional display that uses a single waveguide is illustrated in FIG. 1 and described in the aforementioned U.S. Pat. No. 5,812,186. Referring to FIG. 1 (reproduced from this patent), an (x,z') two-dimensional image in a section 36 of waveguide 35 may be displayed three-dimensionally by first propagating light through the waveguide to section 37 and then to a prism 38 optically coupled to section 37 via a switch made from an image modulating material 39. The image modulating material 39 permits light to escape from the waveguide in a selected plane, and each of the planes that may be selected corresponds to a different value of the y-coordinate of the three-dimensional image.

A disadvantage of the display illustrated in FIG. 1 is that the display provides a three-dimensional image with horizontal parallax, but not vertical, which may be desired in certain applications. In addition, the rate of switching of the image modulating material 39 must be very high (unrealistically high in the current state of the art), since the display scans two of the three dimensions of the image. Finally, because the image is produced by time multiplexing, it is not possible to provide a non-transparent image (i.e., an image in which objects in the foreground block the view of objects behind them), as occurs in a normal three-dimensional scene.

Accordingly, there is a need for improved three-dimensional displays that utilize a single waveguide.

SUMMARY OF THE INVENTION

In one aspect, an apparatus for a three-dimensional display comprises a waveguide having a pair of opposed faces configured to propagate radiation along a length of the waveguide between the faces; a radiation source optically coupled to the waveguide and configured to transmit the radiation to the waveguide; at least one prismatic element having a face optically coupled to at least one of the faces of the waveguide, the face of the prismatic element having a perimeter; and a layer of image modulating material optically coupled to an area of at least one of the faces of the waveguide, at least a portion of the area being located outside the perimeter of the face of the prismatic element.

In another aspect, an apparatus for a three-dimensional display comprises a waveguide having a pair of opposed faces configured to propagate radiation along a length of the waveguide between the faces; a radiation source optically coupled to the waveguide and configured to transmit the radiation to the waveguide; at least one prismatic element having a face optically coupled to at least one of the faces of the waveguide; and a layer of image modulating material optically coupled to at least one of the faces of the waveguide, wherein the waveguide is between the layer of image modulating material and the at least one prismatic element.

These and other aspects of the present invention will be apparent in view of the following description.

BRIEF DESCRIPTION OF THE FIGURES

The drawing Figures depict one or more implementations in accord with the present concepts, by way of example only, not by way of limitations. The drawings are not to scale. In the figures, like reference numerals refer to the same or similar elements.

FIG. 2C is also a schematic cross-sectional side view of a portion of a single waveguide device.

FIG. 3B is a magnified view of the embodiment illustrated in FIG. 3A that includes a microencapsulated electrophoretic medium.

FIG. 4A is a schematic side view of a prism array that may be incorporated in another embodiment of the present invention.

FIG. 5A is a schematic, cross-sectional side view of a three-dimensional display according to another embodiment the invention.

FIG. 8 is a schematic top plan view of a fourth three-dimensional display comprising a plurality of waveguide elements according to another embodiment of the invention.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

Figure 2A:
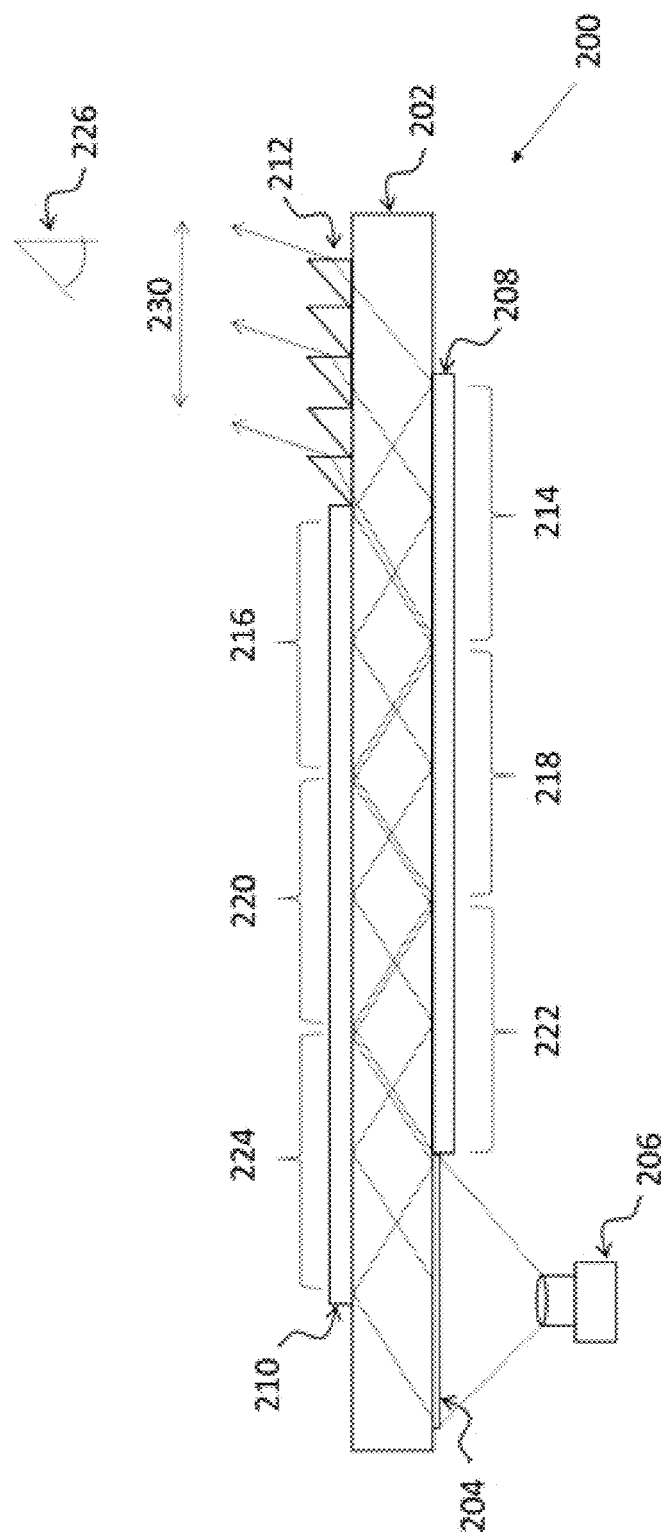
FIG. 2A is a schematic cross-sectional side view of a waveguide device for a three-dimensional display according to an embodiment of the present invention.

Referring now to FIG. 2A, an apparatus 200 for a three-dimensional display according to a first embodiment of the present invention is illustrated, in cross-sectional view. The apparatus 200 comprises a light transmissive waveguide 202 having two opposing planar surfaces. The waveguide 202 may for example be made from glass or a polymeric resin material. The apparatus 200 may further comprise a source of radiation 206 that is optically coupled to a portion of a face of the waveguide 202. This radiation is preferably in the form of visible light and the source, in certain embodiments, may be a pixelated, emissive display using, for example, liquid crystal or organic light emitting diode (OLED) technology or a projector, as shown in FIG. 2A. Alternatively, a non-pixelated light source may be used. Light may be coupled into the waveguide either directly (i.e., through a transparent medium whose refractive index is approximately the same as or higher than the refractive index of the waveguide) or indirectly. In the latter case, the light source may be separated from the waveguide by a layer of (for example) air, and a light scattering, refractive, or diffractive optical element in optical contact with the waveguide (shown as element 204 in FIG. 2A) may mediate the coupling of light from the light source into the waveguide.

Light rays as shown propagating in waveguide 202 remain trapped by total internal reflection when the refractive index of the medium external to the waveguide is less than the refractive index of the material from which the waveguide is made, and the angle of incidence of the light with respect to the normal to the planar surface of the waveguide is greater than the critical angle, $\theta_C = \sin^-(n_1/n_2)$, where $n_1$ and $n_2$ are the refractive indices of the medium external to the waveguide and the medium of the waveguide itself, respectively.

An "image modulating material" as used herein throughout the specification and the claims means a material that (1) may affect the ability of light to propagate through the waveguide (for example, by changing the refractive index of the cladding of the waveguide and/or by absorbing light) and/or (2) may allow light to be coupled into the waveguide (for example, a light scattering, refractive, or fluorescent material). The image modulating material may have one or both properties. For example, the image modulating material may comprise a light scattering material with a higher refractive index than the waveguide, and thus may change the effective refractive index of the cladding of the waveguide and also scatter light. Referring again to FIG. 2A, image modulating layer assemblies 208 and 210 containing image-modulating materials may be optically coupled to the opposing faces of the waveguide. In some embodiments of the invention an image modulating layer may be coupled to only one face of the waveguide (i.e., one of layer assemblies 208 and 210 may be absent).

In a preferred embodiment, the image modulating material is an electro-optic material, more preferably a bistable electro-optic material. The term "electro-optic" is used herein throughout the specification and the claims to refer to a material having first and second states differing in at least one optical property, the material being changed from its first to its second state by application of an electric field to the material. Although the optical property is typically color perceptible to the human eye, it may be another optical property, such as optical transmission, reflectance, luminescence or pseudo color in the sense of a change in reflectance of electromagnetic wavelengths outside the visible range. The terms "bistable" and "bistability" are used herein in the specification and claims to refer to certain electro-optic materials that after having been driven, by means of an addressing pulse of finite duration, to assume either its first or second display state, that state will persist after the addressing pulse has terminated for at least several times, for example at least four times, the minimum duration of the addressing pulse required to change the state of the display element.

One type of electro-optic material is an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic material is an electro-wetting medium as developed for example by Philips and described in Hayes, R. A., et al., "Video-Speed Electronic Paper Based on Electrowetting", Nature, 425, 383-385 (2003). It is shown in U.S. Pat. No. 7,420,549 that such electro wetting displays can be made bistable.

Yet another type of electro-optic material, which has been the subject of intense research and development for a number of years, is the particle-based electrophoretic media, in which a plurality of charged particles move through a fluid under the influence of an electric field. The fluid is generally a liquid, but electrophoretic media can be produced using gaseous fluids; see, for example, Kitamura, T., et al., "Electrical toner movement for electronic paper like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291.

Numerous patents and applications assigned to or in the names of the Massachusetts Institute of Technology (MTU), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically mobile particles in a fluid medium, and a capsule wall surrounding the internal phase. Typically, the capsules are themselves held within a polymeric binder to form a coherent layer positioned between two electrodes. Alternatively, the charged particles and the fluid may be retained within a plurality of sealed cavities formed within a carrier medium, typically a polymeric film, often referred to as microcells. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and subassemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564; and (h) Methods for driving displays; see for example U.S. Pat. Nos. 7,012,600 and 7,453,445.

Many of the aforementioned patents and applications recognize that the walls surrounding the discrete microcapsules in an encapsulated electrophoretic medium could be replaced by a continuous phase, thus producing a so called polymer dispersed electrophoretic medium, in which the electrophoretic medium comprises a plurality of discrete droplets of an electrophoretic fluid and a continuous phase of a polymeric material, and that the discrete droplets of electrophoretic fluid within such a polymer dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer dispersed electrophoretic media are regarded as subspecies of encapsulated electrophoretic media.

An encapsulated electrophoretic medium typically does not suffer from the clustering and settling failure mode of traditional electrophoretic devices and provides further advantages, such as the ability to print or coat the medium on a wide variety of flexible and rigid substrates. Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see U.S. Pat. No. 7,339,715); and other similar techniques).

Other types of electro-optic media may also be used in the displays of the present invention.

Referring again to FIG. 2A, image modulating layer assemblies 208 and 210 may comprise segmented or active matrix electrophoretic displays. An electro-optic display normally comprises a layer of electro-optic material and at least two other layers disposed on opposed sides of the electro-optic material, one of these two layers being an electrode layer. In most such displays both the layers are electrode layers, and one or both of the electrode layers are light transmissive and/or patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. The modulation of the reflective properties of the opposing surfaces of the waveguide in some of the embodiments of the present invention may therefore be provided by electrophoretic motion of pigments having a relatively high refractive index in a solvent having a refractive index that is lower than that of the waveguide, such as the modulation illustrated in FIG. 2B.

Figure 2B:
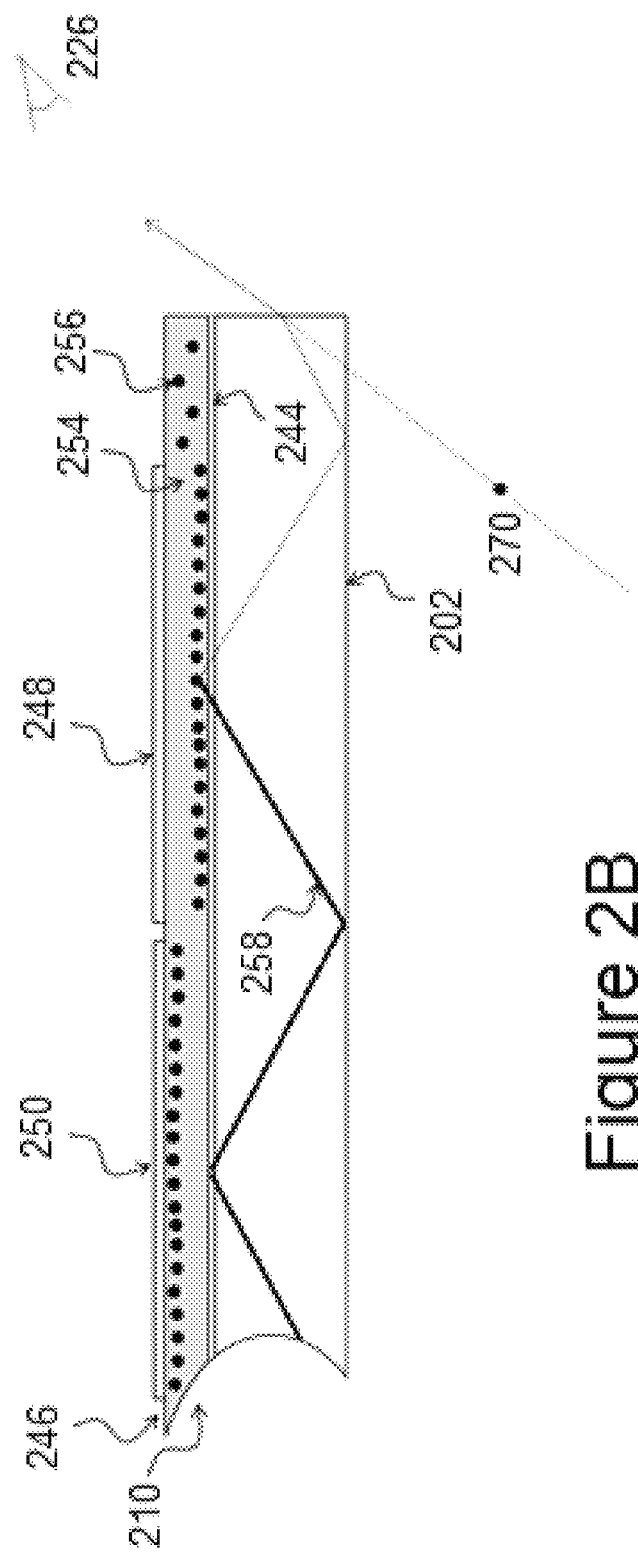
FIG. 2B is a schematic cross-sectional side view of a portion of a single waveguide device.

In FIG. 2B, an optically transparent waveguide 202 overlaid by a transparent, electrically conductive layer 244. Spanning the gap between layer 244 and a layer 246 that bears an array of individually addressable electrodes (conventionally termed the "backplane", although shown in FIG. 2B as the uppermost layer) is an electrophoretic fluid layer 210. The electrophoretic fluid comprises a suspending fluid 254 having a refractive index lower than that of waveguide 202 and charged particles 256 that have a refractive index higher than that of the suspending fluid 254 and preferably higher than that of the waveguide 202. Particles 256 may be positively or negatively charged and may absorb and/or scatter light of visible wavelengths.

When a voltage difference is provided between transparent electrode 244 and one of the backplane electrodes, particles move in the resulting electric field so as to be attracted to or repelled from the transparent electrode 244, depending on the charge of the particles and the polarity of the voltage difference. In FIG. 2B, particles are shown as attracted to the transparent electrode 244 in the region addressed by backplane electrode 248, and repelled from it in the region addressed by backplane electrode 250. Light propagating in the waveguide (illustrated by ray 258 in FIG. 2B) is totally internally reflected in the region addressed by electrode 250, since in this region the electrophoretic medium adjacent to the waveguide has a refractive index lower than that of the waveguide and it is assumed that ray 258 is shallow enough that its angle of incidence with respect to the normal of the interface between the waveguide and the electrophoretic medium is larger than the critical angle for total internal reflection.

In the region addressed by electrode 248, however, the presence of mobile particles in the electrophoretic fluid adjacent to transparent conductive layer 244 causes total internal reflection to be frustrated, and light penetrates the electrophoretic fluid, where it is absorbed or scattered by the mobile particles. This absorption and/or scattering provides an image point which is visible to an observer 226 looking into the end of the waveguide, who perceives it as lying below the plane of the waveguide at the location illustrated by point 270 in FIG. 2B as a result of the reflections in the planar faces of the waveguide and the refraction at the waveguide/air interface. Because light is folded through the waveguide, observer 226 cannot see backplane 246 or the electrophoretic fluid layer 210 except in the regions where total internal reflection has been frustrated.

In FIG. 2B total internal reflection is modulated on only one face of the waveguide. In FIG. 2A total internal reflection is modulated on both faces, which increases the depth resolution of the display.

A display made according to an embodiment of the present invention may achieve the desired optical effect over a range of viewing angles, whose limits will now be described in more detail. With reference to FIG. 2C, $\theta$ will be used to denote the angle between a ray of light inside the waveguide and the vertical axis, normal to the electrode-fluid interfaces, and $\Phi$, the "viewing angle", to denote the angle between a ray of light in air and the horizontal axes. If $n_2$ is the refractive index of the waveguide, and $n_1$ the refractive index of the suspending fluid of the electrophoretic dispersion, and the refractive index of air is assumed to be 1, then the two angles are related by Snell's law at the waveguide/air interface (Equation 1):

$$\mathrm{Sin}(\Phi) = n_2 \cos(\theta) \quad (1)$$

The high angle limit results from the refractive index contrast between the suspending fluid and the waveguide, as described above. Because the minimum value of $\theta$ is given by $\sin^{-1}(n_1/n_2)$, the maximum display angle $\Phi_{max}$ is given by Equation 2:

$$\Phi_{max} = \sin^{-1}(n_2 \cos(\sin^{-1}(n_1/n_2))) = \sin^{-1}(\sqrt{(n_2^2 - n_1^2)}) \quad (2)$$

The low angle-viewing limit, $\Phi_{min}$, is set by the intended resolution of the rendered three-dimensional image. Let d denote the thickness of a single waveguide (the vertical resolution), and w the size of the finest horizontal feature that an operator hopes to resolve (i.e. the length or width of a backplane electrode), as shown in FIG. 2C. If a ray of light is shallow enough to have $\tan(\theta) > w/2d$, then depending on the point the ray enters the waveguide, it may skip past an entire electrode, causing the image to not be fully displayed. The limiting angle $\Phi_{min}$ is therefore given by Equation 3:

$$\Phi_{min} = \sin^{-1}(n_2 \cos(\tan^{-1}(w/2d))) = \sin^{-1}(n_2/\sqrt{(1 + (w/2d)^2)}) \quad (3)$$

Note that w is defined on an image-by-image basis, rather than a device-by-device basis. For many applications, by driving nearby electrodes with identical patterns, decreasing its effective resolution, the image can be made mostly viewable even at angles substantially below $\Phi_{min}$.

Desirably, $\Phi_{max}$ is as large as possible and $\Phi_{min}$ as small as possible. This is may be achieved by maximizing the refractive index of the waveguide, minimizing the refractive index of the suspending fluid, minimizing the thickness of waveguide, and maximizing the coarseness of the horizontal image resolution.

In a preferred embodiment of the present invention, the transparent and electrically conductive layer is provided on a transparent intermediate substrate, which is bonded to the waveguide using an optically clear adhesive whose refractive index is equal to or higher than the refractive index of the waveguide. This approach is preferable because only the electrically modulated portion of the area of the intermediate substrate need be bonded to the waveguide. Non-modulated parts of this area, for example, the regions of edge seals, remain separated from the waveguide by a layer of air and are thus not seen by an observer looking into the edge of the display. In general, only those regions of the electrophoretic cell that are intended to be seen by the viewer of the display are optically coupled to the waveguide in this embodiment of the invention.

Figure 3A:
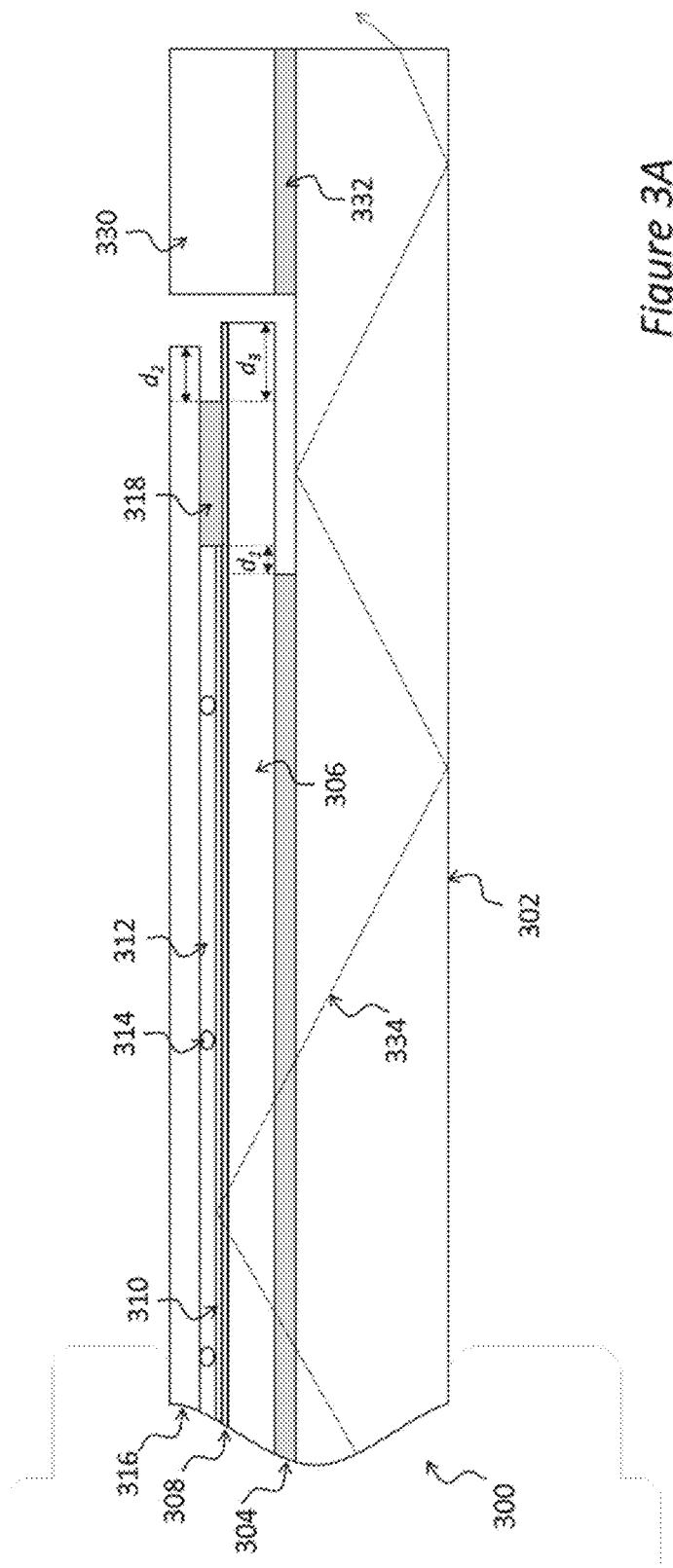
FIG. 3A is a schematic cross-sectional side view of a portion of a waveguide device according to a preferred embodiment of the present invention.

For example, FIG. 3A illustrates a waveguide module 300 according to one preferred embodiment of the invention. Waveguide 302 is coupled to intermediate substrate 306 by means of optically clear adhesive 304. On the opposite side of intermediate substrate 306 is a transparent, electrically conductive layer 308, which is optionally provided with a protective polymer layer 310. Electrophoretic fluid 312 is contained within a cavity defined by intermediate substrate 306 (and its associated surface coatings) and backplane 316. The width of this cavity is maintained by optional spacers 314 that may, for example, be beads, threads, or meshes. The edges of the cavity are sealed with a polymeric material 318 that, optionally and preferably, may be the same optically clear adhesive as that used to bond intermediate substrate 306 to waveguide 302. The optically clear adhesive layer 304 that bonds intermediate substrate 306 to waveguide 302 preferably does not extend as far as the edge seal 318 (i.e., the distance d1 shown in FIG. 3A is >0). Either the backplane or the intermediate substrate may extend beyond the edge seal if desired (as shown by distances d2 and d3 in FIG. 3A).

FIG. 3A also provides for a spacer 330 that is bonded and optically coupled to the waveguide and abuts the viewing surface. Optionally, this bonding is achieved by a layer of optically clear adhesive 332. The combined thickness of spacer 330 and adhesive layer 332 is at least as thick as the combination of optically clear adhesive 304, intermediate substrate 306, layers 308 and 310, electrophoretic fluid 312, and backplane 316.

Figure 3C:
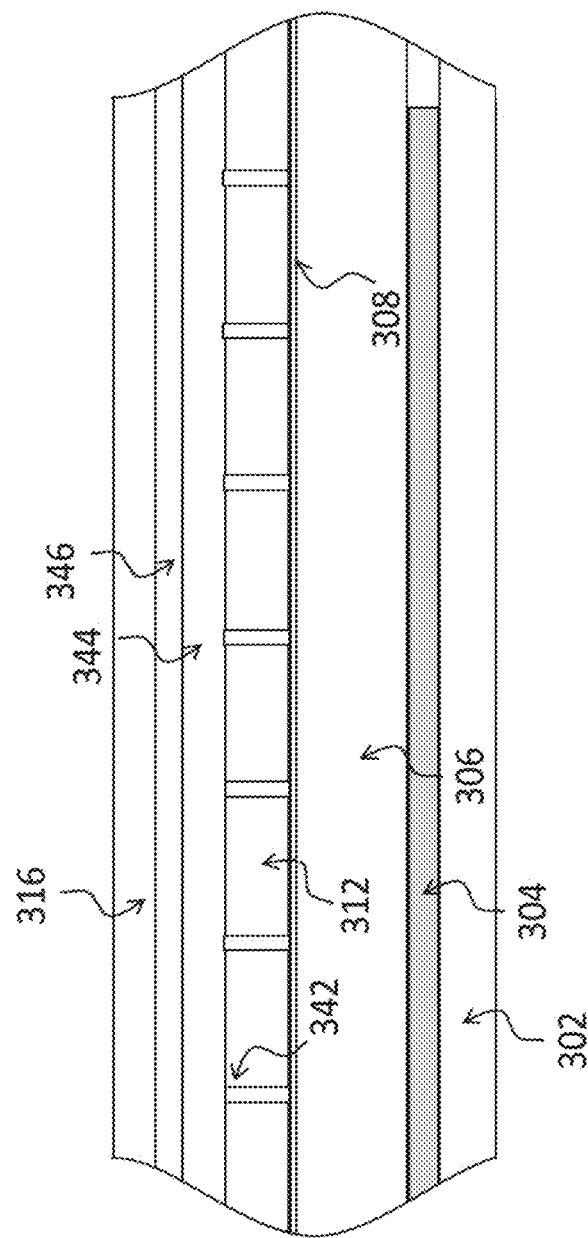
FIG. 3C is a magnified view of the embodiment illustrated in FIG. 3A that includes another microencapsulated electrophoretic medium.

As described above, the electrophoretic fluid 312 is contained within a cavity without further compartmentalization. However, it is possible also to incorporate the electrophoretic fluid within microcapsules or microcells, as shown in FIGS. 3B and 3C. Compartmentalization of the electrophoretic fluid limits the gravitational settling of the electrophoretic fluid and is particularly advantageous if the waveguides are oriented in a vertical plane.

FIG. 3B shows an enlarged view, not to scale, of the alternative construction to the non-compartmentalized cell of FIG. 3A in which the electrophoretic fluid 312 is contained within microcapsules 336. The microcapsules are coated directly onto the transparent, conductive layer 308, and laminated to the backplane 316 using a conventional, electrically conductive adhesive layer 338. Preferably, the microcapsules are coated onto transparent conductive layer 308 without an additional polymeric binder, such that any gaps between capsules (shown as 340 in FIG. 3B) are filled with air and not by polymeric material. If a polymeric binder is used, it should have a refractive index lower than that of the waveguide and preferably equal to or lower than the refractive index of the suspending fluid for the electrophoretic particles. In this way, total internal reflection is not disrupted in regions of the microcapsule coating where the electrophoretic fluid is not present.

FIG. 3C shows an enlarged view, not to scale, of an alternative construction to the non-compartmentalized cell of FIG. 3A in which the electrophoretic fluid 312 is contained within microcells. The walls of the microcells are indicated by elements 342. The microcells are preferably made from polymeric material of which the refractive index is low, i.e., equal to or lower than the refractive index of the suspending fluid for the electrophoretic particles, and the walls should be adhered to the transparent, conductive layer 308 by means of a material of low refractive index. The microcells are sealed with an optional layer 344 and laminated to the backplane 316 by an adhesive layer 346.

Figure 3D:
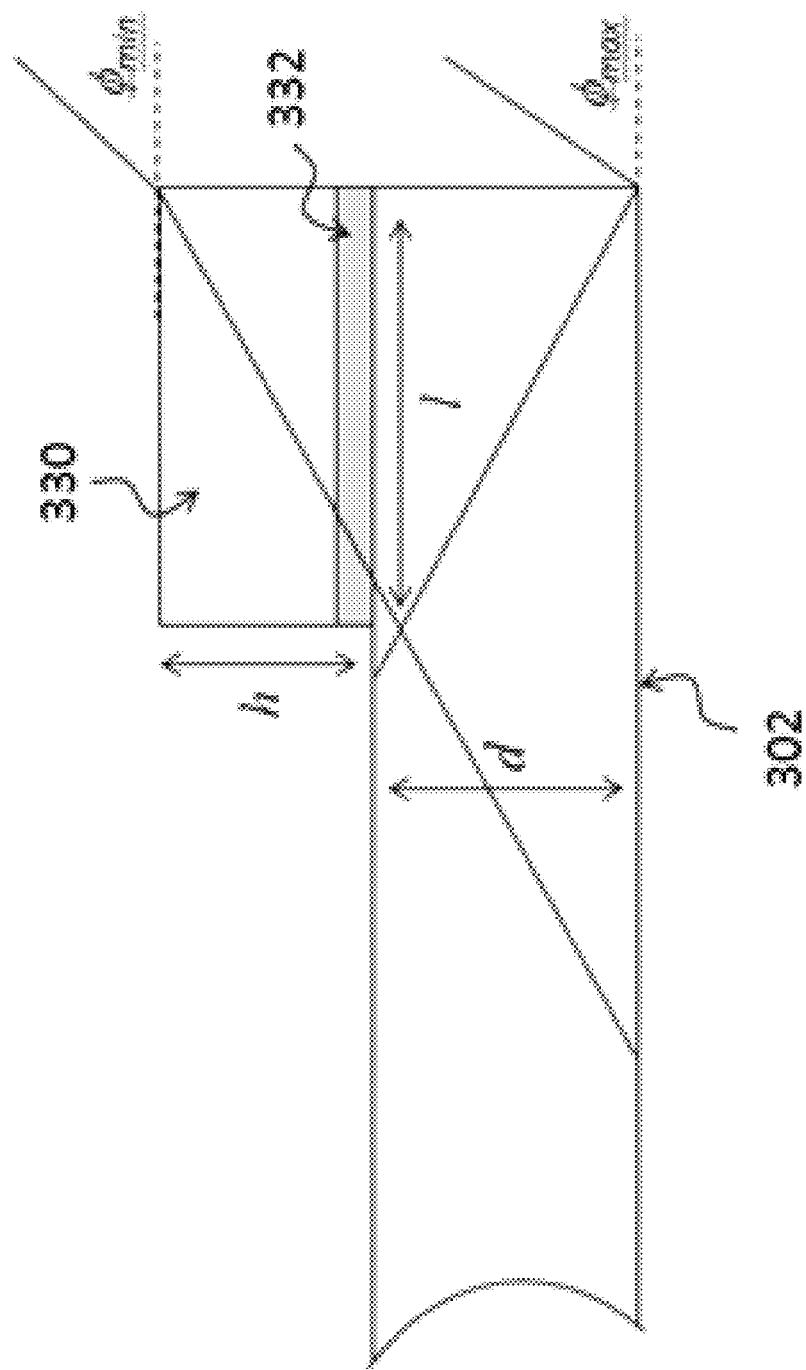
FIG. 3D is a magnified view of the spacer and waveguide of the embodiment illustrated in FIG. 3A.

The dimensions of the spacer 330 and associated adhesive layer 332, as shown in FIG. 3D, is preferably arranged to avoid exposing the rear face of the spacer to the viewer. The spacer should be long enough to place its rear face out of direct view at the minimum viewing angle, but at the same time, it should be short enough to place its rear face out of reflected view at the maximum viewing angle. If the required height h is thin enough (an approximate, but useful comparison value is $d*\Phi_{min}/\Phi_{max}$), these constraints can be simultaneously satisfied with the right value of dimension l; if not, then the visibility of the rear wall imposes an additional constraint on the range of achievable viewing angles.

Referring again to FIG. 2A, the display 200 provides a three-dimensional image in which the x dimension is provided by rows of pixels in light source 206 (when this is pixelated) and image modulating regions 208 and 210 that extend normal to the plane of the cross-sectional drawing. The y dimension is provided by pixels that extend in the L/R direction in FIG. 2A in light source 206 (when this is pixelated) and image modulating regions 208 and 210. The z dimension is divided into seven planes in the embodiment of FIG. 2A. The plane most distant from viewer 226 is provided by the light source image 206. In order of perceived distance from the viewer (farthest listed first), the other six planes are provided by independently modulated regions 224, 222, 220, 218, 216 and 214 of image modulating regions 208 and 210.

Light exiting the waveguide may be transmitted through one or more prismatic elements 212 that are optically coupled to a face of the waveguide. The viewing window, shown as length 230 in FIG. 2A, depends upon the angle of view and the thickness and refractive index of the waveguide and its cladding. It may be preferred to size the viewing window to an angle of view as close to perpendicular to the plane of the waveguide as possible.

Figure 1:
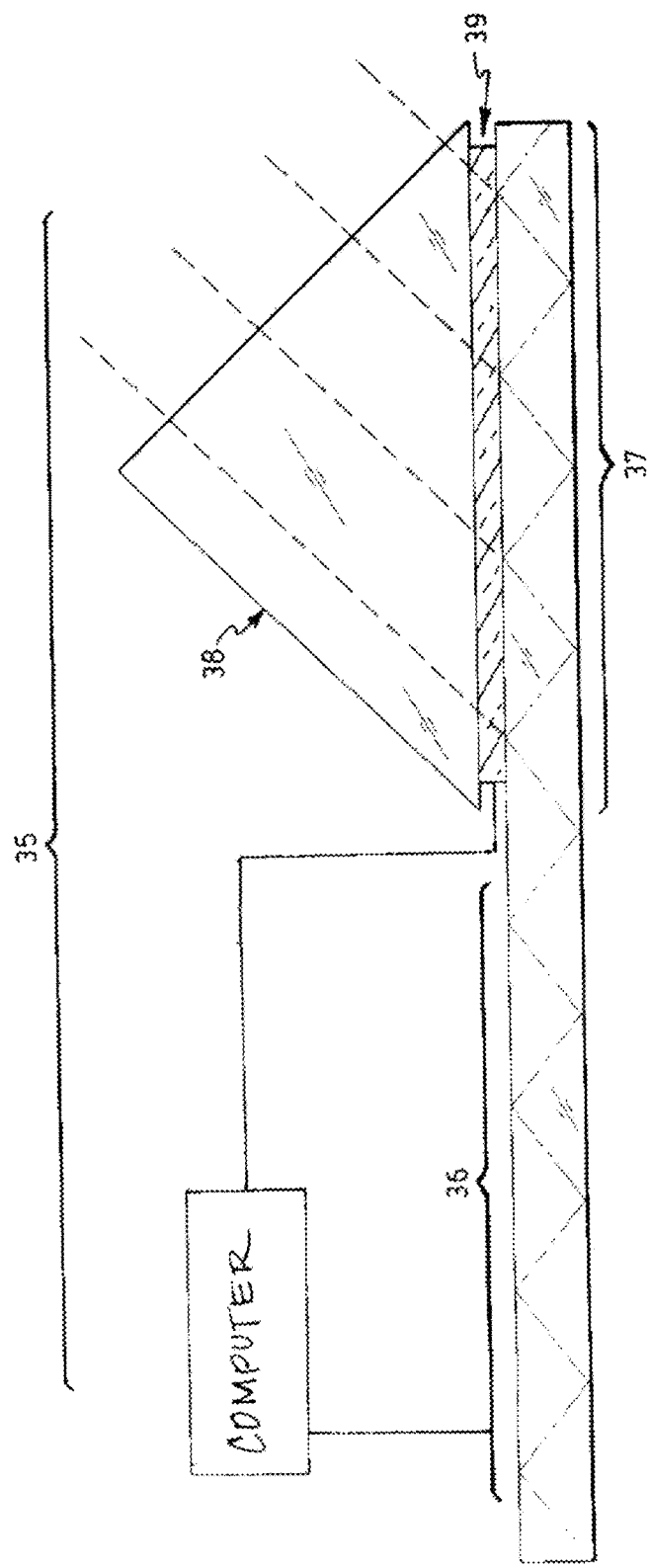
FIG. 1 is a schematic cross-sectional side view of a waveguide device for a three-dimensional display.

As illustrated in FIG. 2A, the three dimensional display differs from previous displays, such as those illustrated in FIG. 1, in that the displays made according to various embodiments of the present invention are generally free of any switching material between the prismatic element and the waveguide. In other words, the image modulating material may be applied to one or both of the opposing faces of the waveguide in an area that is outside the footprint of the prismatic element(s), i.e. outside the area bounded by the perimeter of the face of the prismatic elements(s) coupled to the waveguide.

The device made according to the various embodiments of the present invention may include a single prismatic element or alternatively, an array of prismatic elements. One preferred prism geometry is an array of prismatic elements having an asymmetrical design, as illustrated in FIG. 4A. Such prism arrays are available, for example, as "light turning films", one example of which is a 29-degree light turning film, available from Film Optics Ltd, Oxfordshire, UK. The prism elements 401 are illustrated in cross-sectional view, and extend across the whole width of the prism film sheet. Any optical element that causes light to escape the waveguide without loss of image content may be used, however. For example, a diffractive or holographic element may be employed.

The prismatic elements, if used, are preferably disposed on a transparent intermediate substrate 403 having a thickness of approximately 10-500 microns that is optically coupled to one of the opposing faces of the waveguide. Referring again to FIG. 4A, the prismatic elements 401 within the array preferably have a pitch 409 of about 25 to about 1000 microns, with a preferred pitch in the range of about 50 to about 200 microns. Each prismatic element may include a first angle 405 that is proximate to the radiation source (such as source 206 in FIG. 2A) and a second angle 407 that is distal relative to the radiation source. Angle 405 is preferably in the range of about 20 to about 45 degrees, while angle 407 is larger than angle 405 and is preferably in the range of about 60 to about 90 degrees. Larger values of angle 405 may lead to refraction of light exiting the waveguide such that it is closer to perpendicular to the plane of the waveguide, enabling the display to be viewed at a natural angle. Alternatively, angle 405 may be in the range of about 45 to about 60 degrees, but in this case, another optical element may be required to bend the light towards the viewer.

Note that the orientation of the displays shown in the various figures are horizontal, but it may be preferred in certain applications to align the displays vertically.

The waveguide thickness used in the devices made according to the various embodiments of the present invention may be less than or equal to about half the width of the viewing window of the display. As previously noted, the area between the prismatic element(s) and the waveguide is generally free of any image modulating material. The combination of these two features provide a display in which a three-dimensional image having both horizontal and vertical parallax can be displayed, as is illustrated in FIG. 4B.

Figure 4B:
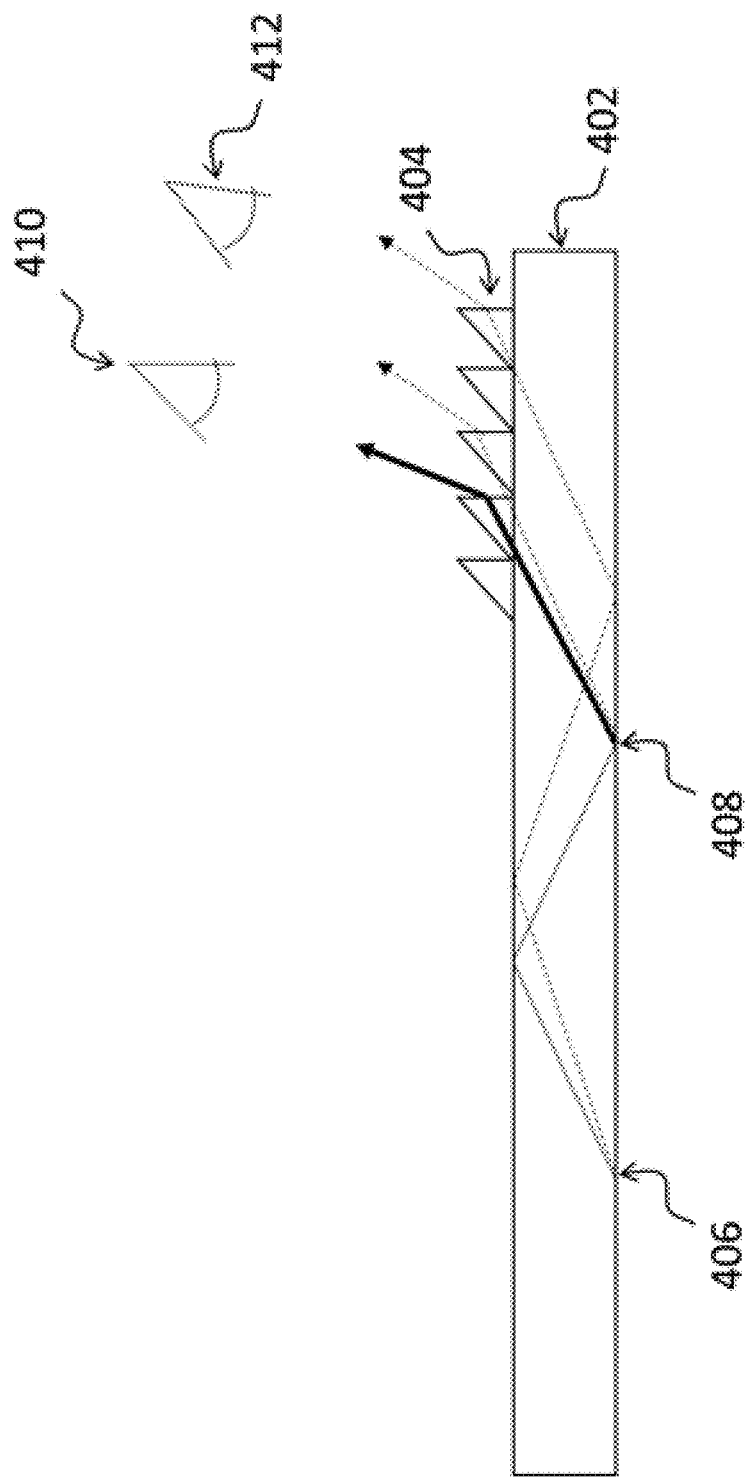
FIG. 4B is a schematic, cross-sectional side view showing light traveling within a waveguide that may be included in an embodiment of the present invention.

FIG. 4B shows how light originating at image points 406 and 408 would be perceived by viewers located at positions 410 and 412. The viewer at position 410 would see image point 406 appearing directly behind (and occluded by) image point 408, as illustrated by the light rays drawn in the diagram propagating in waveguide 402 and exiting through prismatic elements 404. The bold ray is intended to show the combination of light from the two image points. A viewer at position 412, however, would be able to see both image points, as shown by the dotted rays. The more distant image point 406 would appear to the left (as drawn) of the closer image point 408. Thus, by moving between positions 410 and 412 the viewer would perceive the "altitudinal parallax" between the two points. Note that the alternative term "vertical parallax" strictly would only apply to the case wherein the waveguide was itself vertical. The "azimuthal parallax" (alternatively termed "horizontal parallax") would be provided by image points separated in the direction perpendicular to the plane of the paper in the Figure.

Figure 5B:
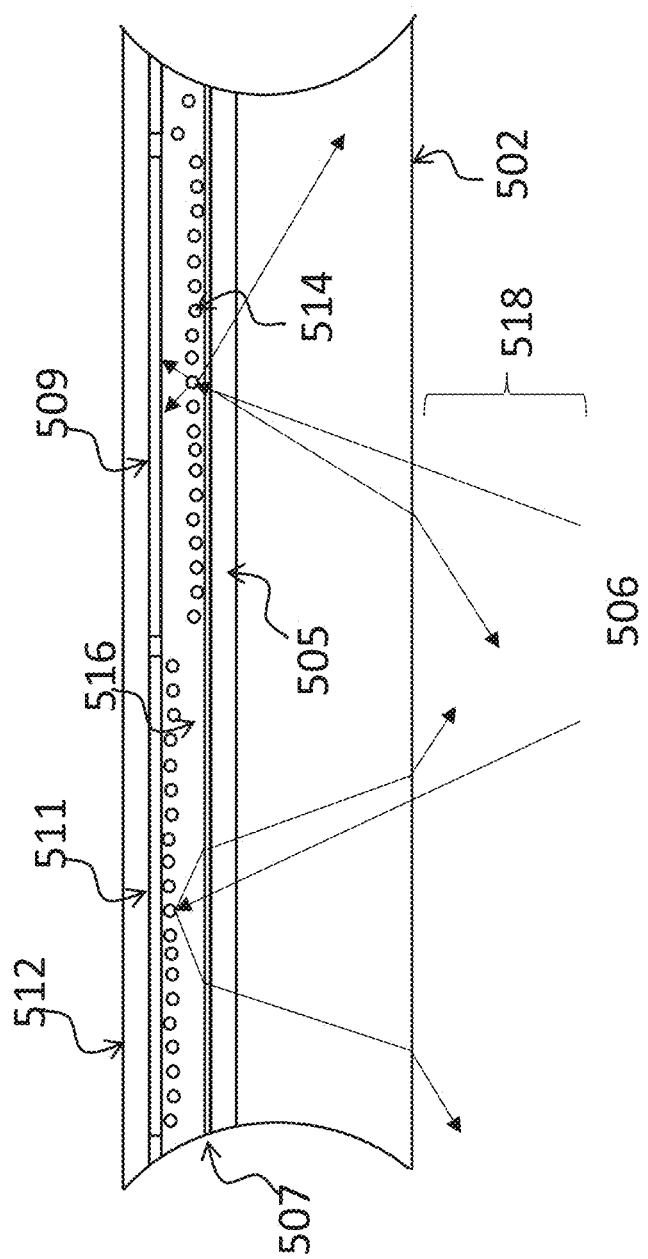
FIG. 5B is a magnified view of a portion of the cross-sectional side view of FIG. 5A.

Some particularly preferred embodiments of the invention will now be described in more detail. A first preferred embodiment is hereinafter referred to as an "electrophoretic light scattering" or "ELS" display. The principle of operation of an ELS display is shown in FIGS. 5A and 5B. In this embodiment of the invention, as shown in FIG. 5A, an image-modulating layer is provided on only one face of the waveguide, which may be the face bearing the prismatic out-coupling element 510 as illustrated or the opposite face. Waveguide 502 is optically coupled to image modulating region 508 and an optional region 504 through which light may be coupled into the waveguide, for example by light scattering. A light source 506, shown in the Figure as a projector, illuminates the image-modulating region 508 and the light coupling region 504 through the transparent waveguide. Note that, as mentioned above, alternative light sources may be used instead of a projector, for example planar light emitting displays such as liquid crystal or OLED displays.

The detailed operation of the display is illustrated in FIG. 5B, which is a magnified view (not to scale) of the cross-sectional portion of the display as indicated by the dotted rectangle in FIG. 5A.

As shown in FIG. 5B, waveguide 502 is optically coupled by layer (or layers) 505 to a transparent electrode 507. Layers 505 may comprise an optically clear adhesive layer bonded to waveguide 502 and a transparent substrate (for example, a poly(ethylene terephthate) of polycarbonate film) between the optically clear adhesive layer and the transparent electrode 507. Electrode 507 may cover the entire area of the image modulating region of the display (i.e., may correspond to the common electrode in conventional electrophoretic displays) or may be pixelated. A cavity 516 separates transparent electrode 507 from substrate 512, which bears pixel electrodes 509 and 511. Cavity 516 is filled with an electrophoretic composition which comprises a fluid (for example, a gas or a solvent of low refractive index) containing electrophoretically mobile particles 514. The electrophoretic composition may also comprise additives, for example polymers or surfactants, as is well known in the art. The solvent, if used, has a refractive index lower than that of the waveguide 502, transparent electrode 507, and layers 505. On the opposite face of the waveguide from the electrophoretic composition is the source of light 506, separated from waveguide 502 by a medium 518 of lower refractive index than the waveguide. Conveniently, layer 518 is an air layer. As described above, light source 506 may be pixelated and provide an image that may be colored or monochrome. For example, light source 506 may be a projector providing an image that is focused onto the electrophoretic layer. Alternatively, light source 506 may be non-pixelated and provide uniform illumination.

Light from light source 506 travels through layer 518, waveguide 502, layers 505 and transparent electrode 507 to the electrophoretic composition, where it is scattered by particles 514. Whether or not the scattered light enters the waveguide depends upon the position of particles 514. In FIG. 5B, some of the particles 514 are shown to be adjacent to electrode 511 and separated from the transparent electrode 505 (which is optically coupled to the waveguide) by the fluid that fills cavity 516. Since, as noted above, this fluid has a lower refractive index than the waveguide itself or the other intervening layers, scattered light will not enter the waveguide but will be refracted as it passes through the waveguide 502 back towards the light source 506. In the vicinity of electrode 509, on the other hand, scattered light is coupled into the waveguide 502, since the combination of particles 514 and the solvent has a higher refractive index than the waveguide 502 or the intervening layers 505. Thus, in the region of electrode 509 an image point is formed that has the color of the incident light from light source 506.

It will be clear to those of skill in the art that application of an appropriate electric field can be used to move particles 514 to the front or the back of cavity 516. It will also be clear that the gap thickness of cavity 516 could be maintained by appropriate members, such as walls, pillars, or beads, and that micro-compartments such as microcells or microcapsules could be used to contain the electrophoretic composition. It will likewise be clear that other layers, not shown, such as conductive adhesive or other layers, may be included between electrode 507 and the plane of electrodes 509 and 511.

A full color image may be formed in which objects closer to the viewer occlude objects more remote from the viewer. Light from a more distant object propagating within the waveguide will exit the waveguide at the position of the closer object (because at this position the refractive index of the cladding is higher than that of the waveguide) and be scattered again by particles 514. Since the scattering is isotropic, only a small portion of the scattered light will be at such an angle as to propagate in the direction of the viewer within the waveguide. Light from the more distant object will have been scattered twice, while propagating light from the closer object will only have been scattered once, and will consequently be significantly higher in intensity. The position of image points in three-dimensional space is determined by the position of light scattering particles 514 relative to the waveguide. The color of the image points will be determined by the image projected onto the light scattering particles by light source 506.

It is possible that the most distant plane of the image, corresponding to light source 206 shown in FIG. 2A, could be provided by light from a light source incident on a region of the waveguide to which a light scattering surface has been permanently optically coupled, as mentioned above.

A second preferred embodiment of the display is hereinafter referred to as a "passively coupled" display, wherein image-modulating region 508 in FIG. 5A comprises a coating or coatings onto the waveguide 502 comprising fluorescent or light scattering materials.

The embodiment in which image modulating region 508 comprises a light scattering material is similar to the previously described embodiment comprising the electrophoretic scattering display except that the degree of light scattering cannot be dynamically altered. The result is that the contrast ratio available from a passively scattering display of the invention is much lower than can be achieved in the electrophoretically active embodiment. In this embodiment, light from a distal image point is scattered as it is reflected in the waveguide towards the viewer. To avoid occlusion of distal image points, it is preferred that the degree of passive scattering be low. For example, less than 10% of incident light from light source 506, and preferably less than about 5%, should be scattered in a single pass through image modulating region 508. It may also be preferred to provide a gradient of light scattering efficiency, such that regions of image modulating region 508 that are more distant from the prismatic out-coupling element 510 scatter more light than regions closer to out-coupling element 510. For example, a region close to the out-coupling element 510 may scatter about 5% of incident light whereas a point at the furthest distance from the out-coupling element 510 may scatter 20% or more of incident light.

In the passive scattering embodiment of the invention, therefore, unlike the electrophoretically active embodiment, it is difficult to provide complete occlusion of distal image points by proximal image points.

The embodiment of the invention in which a fluorescent material is incorporated into image modulating region 508 does not suffer from the problem that light from distal image points is compromised. For example, light from light source 506 of one wavelength incident on the waveguide may be absorbed and re-emitted at a slightly longer wavelength (the difference between the absorption and emission maxima being referred to as the "Stokes shift"). Ideally the Stokes shift should be large enough that emitted light is not reabsorbed. For example, blue light from light source 506 might be re-emitted as green light that propagates in the waveguide, or (using a different fluorescent material) green incident light might be re-emitted as red light. Blue light might be produced by blue light of a shorter wavelength or ultraviolet light.

Fluorescent materials are well known in the art and may be organic for example, organic dyes such as fluorescein or rhodamine dyes and their derivatives) or inorganic (for example, quantum dots). It is also possible that the waveguide itself could be impregnated with fluorescent materials.

It is preferred to use more than one waveguide if a full color image is to be formed in the passive fluorescent embodiment of the invention. This is because light emitted by one fluorescent material might be absorbed by a second fluorescent material if both fluorescent materials were in optical contact with the same waveguide.

Figure 6:
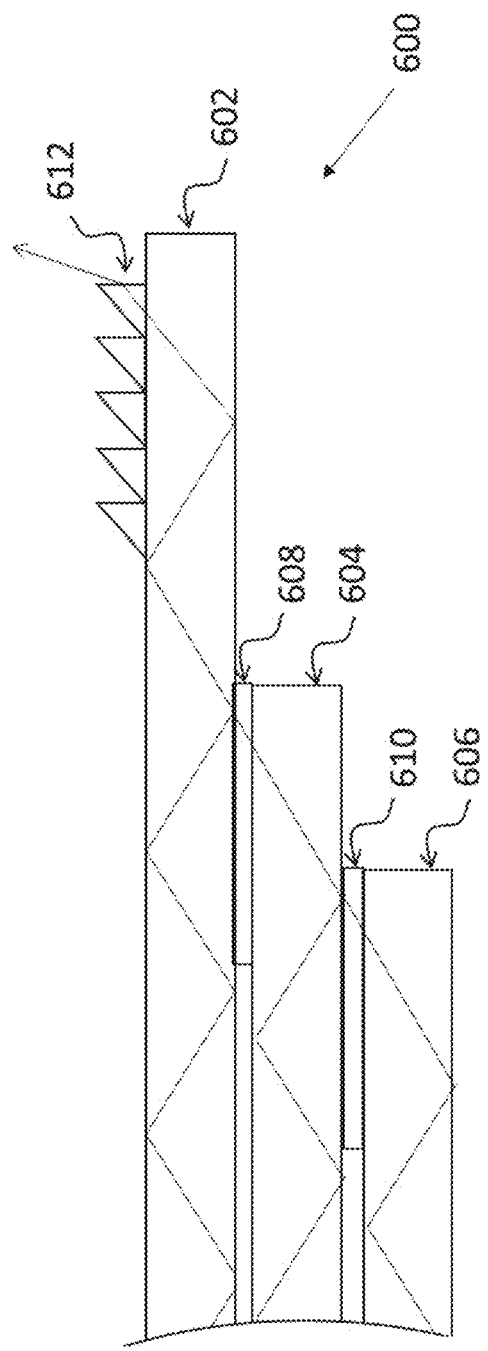
FIG. 6 is a schematic, cross-sectional side view of a three-dimensional display comprising a plurality of waveguide elements according to an embodiment of the invention.

FIG. 6 shows an arrangement by which three different staggered waveguides, each provided with a different fluorescent material, might be coupled together to form a composite, full color image. Waveguide 606, in which light of one wavelength propagates, is optically coupled to waveguide 604 by a dichroic material 610 located between opposing faces of the waveguides 604, 606 in an end region of the lower waveguide 606. The dichroic material 610 transmits light of the wavelength propagating in waveguide 606, but reflects light of the wavelength propagating in waveguide 604. Likewise, waveguide 604 is optically coupled to waveguide 602 by another dichroic material 608 located between opposing faces of waveguides 604, 602 in an end region of the middle waveguide 604. The dichroic material 608 transmits light of wavelengths propagating in waveguides 604 and 606 but reflects light of the wavelength propagating in waveguide 602.

Figure 7A:
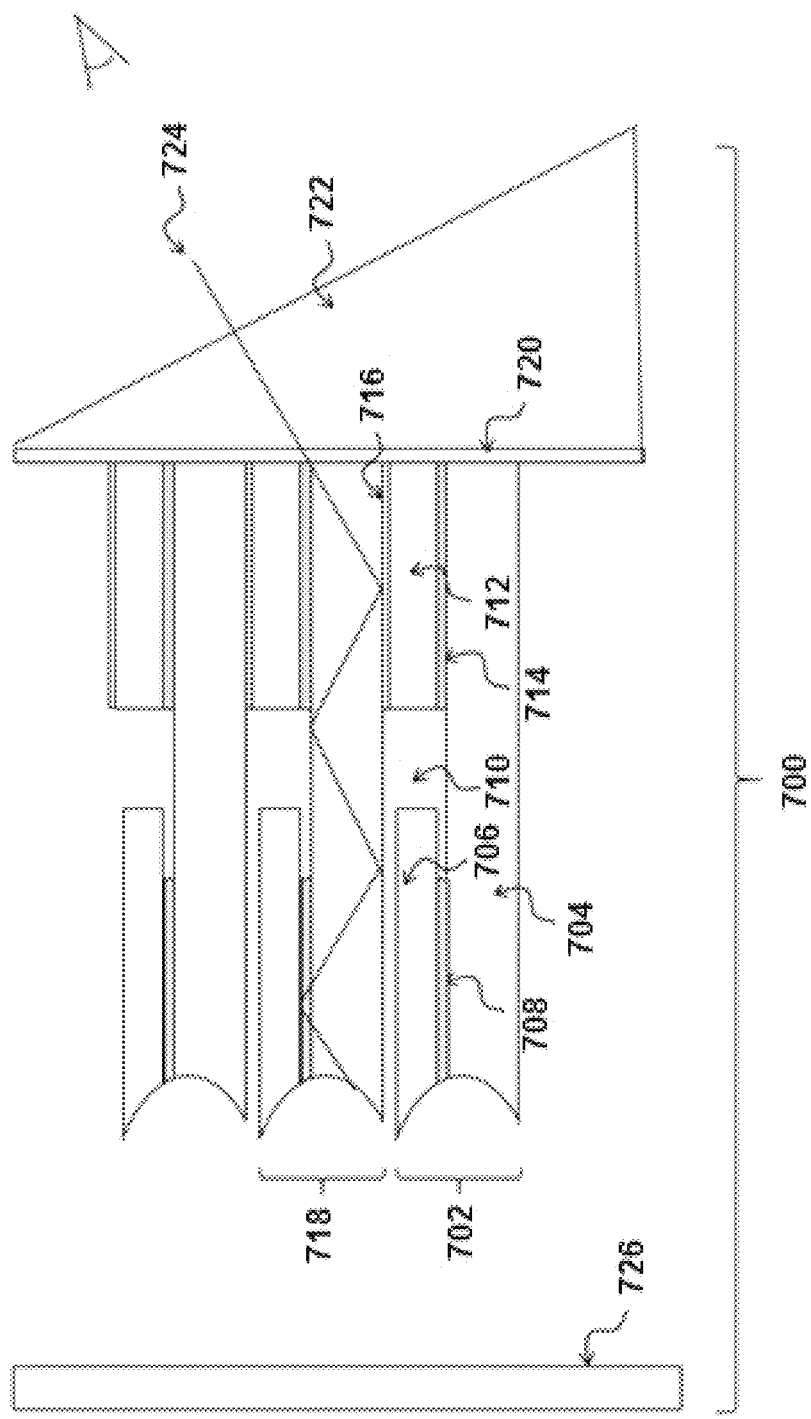
FIG. 7A is a schematic, cross-sectional side view of a first three-dimensional display comprising a plurality of waveguide elements according to an embodiment of the invention.

Similar to the embodiment of FIG. 6, a display comprising a plurality of waveguides may be provided having spacers, such as those described above with respect to FIGS. 3A and 3D. For example, an assembly of waveguide components 702 according to an embodiment of the present invention to form a complete display 700 is illustrated in FIG. 7A. Waveguide 704 is coupled by optically clear layer 708 to an assembly of a secondary substrate, electrophoretic composition, and pixel electrode array shown collectively as 706 in FIG. 7A. Only the electrophoretically active region of assembly 706 is coupled to waveguide 704; elsewhere the two elements are separated by air gap 710. It will be clear to one of ordinary skill in the art that air gap 710 could be replaced by any material having a refractive index equal to or lower than the refractive index of the suspending solvent for the electrophoretic particles.

Spacer 712 is optically coupled to waveguide 704 by layer 714. However, the top of spacer 712 is not optically coupled to the next waveguide module 718, being separated by a layer 716 of refractive index equal to or lower than that of the suspending solvent for the electrophoretic particles. Layer 716 could be an air gap, or a solid or liquid of low refractive index. Layer 716 could also be a mirror layer, or a combination of several layers, provided that light in waveguide module 718 undergoes specular reflection at the interface with layer 716.

Figure 7B:
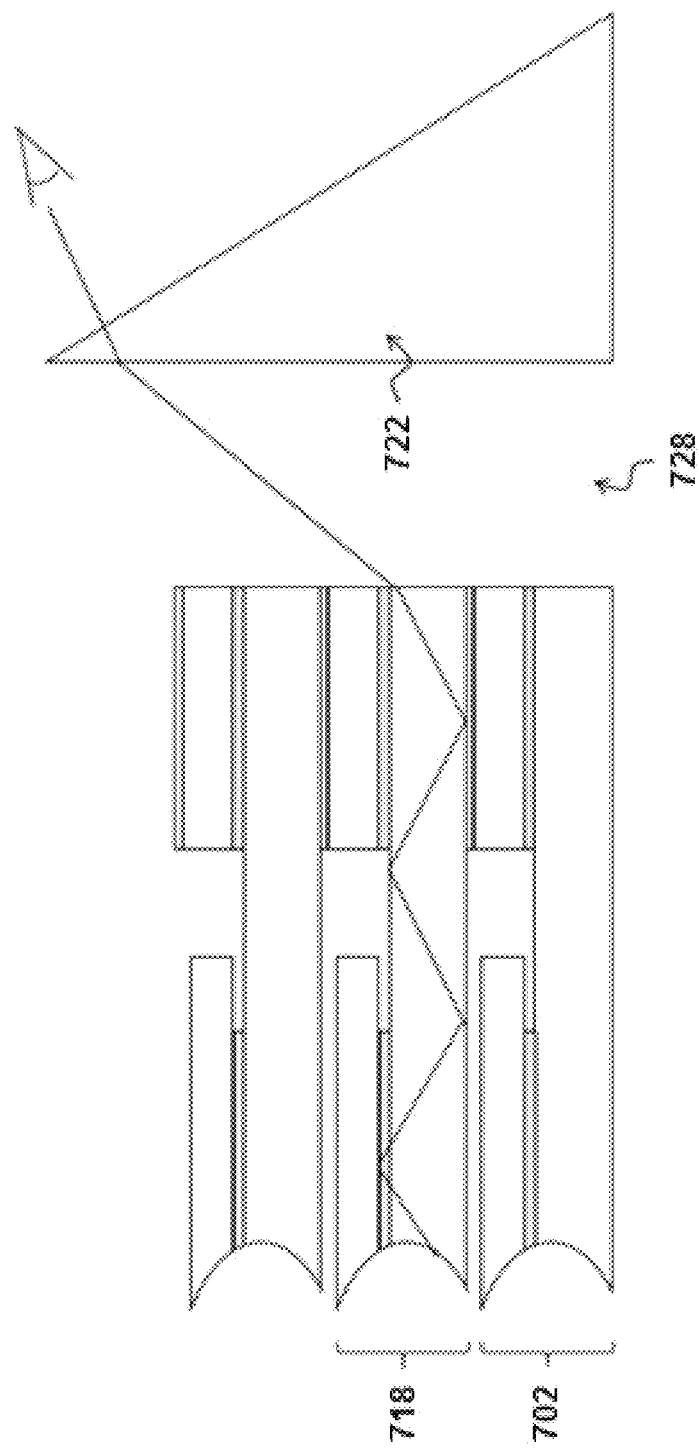
FIG. 7B is a schematic, cross-sectional side view of a second three-dimensional display comprising a plurality of waveguide elements according to another embodiment of the invention.

It may be preferred to shift the range of working viewing angles up or down for the embodiment illustrated in FIG. 7A, and this may be achieved by incorporating an additional optical element that may or may not be optically coupled to the stack of waveguides. In one preferred embodiment this optical element is a prism, shown as 722 in FIG. 7A. This prism is shown as being optically coupled to the waveguide stack by layer 720, which could be achieved with a deformable, clear material, such as a gel, so as to eliminate any optical non-uniformities in the edges of the waveguide assemblies. The optical coupling material 720 may be hardened by, for example, UV curing, as is well known in the art. Alternatively, as illustrated in FIG. 7B, viewing angle tile may be achieved with a prism 722 offset from the waveguide stack by a large column 728 of air or some other lower index material, which shifts the apparent location of the image upwards and slightly backwards (the latter effect being due to the optical path length increase).

Figure 7C:
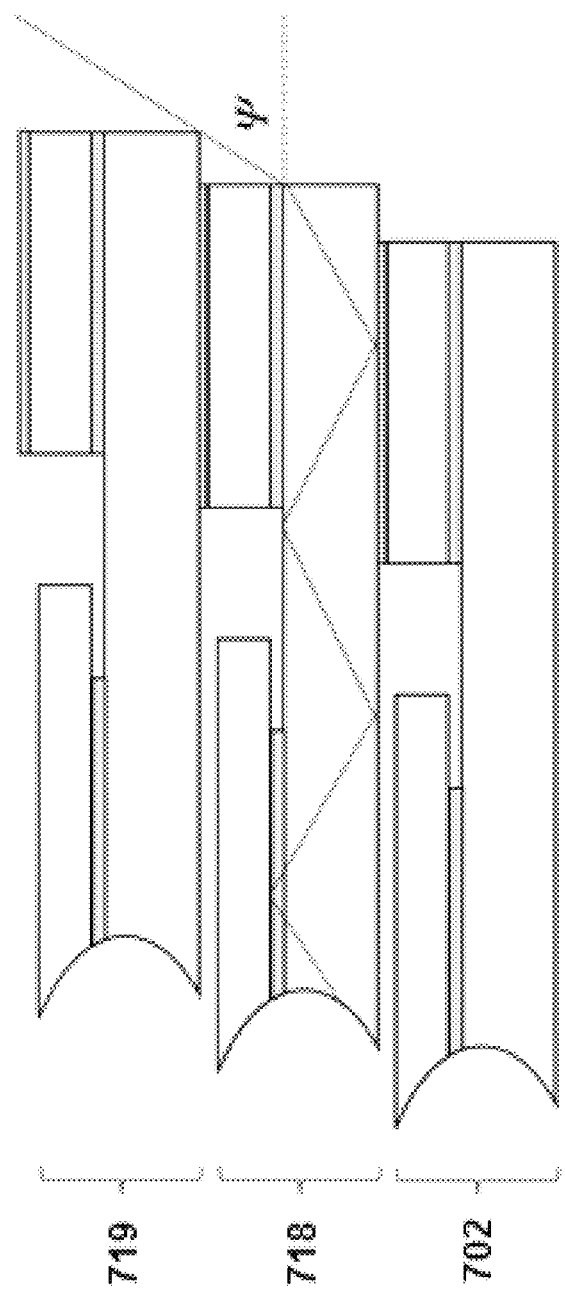
FIG. 7C is a schematic, cross-sectional side view of a third three-dimensional display comprising a plurality of waveguide elements according to another embodiment of the invention.

In order to minimize the visibility of the spacer elements 712 in some embodiments it is preferred to align the individual waveguide elements as shown in FIG. 7C. Middle waveguide element 718 is shown as offset with respect to bottom waveguide element 702 and top waveguide element 719. The top edge of the waveguide portion of middle element 718 and the bottom edge of the waveguide portion of top element 719 define an angle $\Psi$ with respect to the normal to the viewing face, such that $\Phi_{min} \leq \Psi < \Phi_{max}$. A prismatic element can be located between the face of the offset waveguide elements and the viewer, as illustrated for a non-offset stack of waveguide elements in FIG. 7B.

Optionally, the back side of the display can be configured in the same way as the front. In this case viewers will be able to see three-dimensional rendered objects from the front or the rear. Alternatively, the display can be backlit, with a secondary two-dimensional display 726 (as shown in FIG. 7A) that can be emissive or reflective.

As discussed above, each waveguide subassembly comprises an addressable pixel array of backplane electrodes. The addressing of individual pixels in one plane can be achieved using conventional methods used for addressing two-dimensional displays. Each pixel can be individually addressed from some control switch, or alternatively the pixel array can comprise logic elements, such as thin film transistors, so that active matrix addressing can be achieved.

As shown in FIG. 8, which is a cross-sectional top plan view of the viewing surface of a display, it is even possible to use a flexible active matrix backplane 804, or a set of rigid active matrix backplanes connected together with flexible circuit elements, so that the whole display can be addressed by a single controller 806. If element 804 is a flexible active matrix pixel array, waveguide elements 802 are addressed from the same face of the pixel array. In one preferred embodiment the flexible backplane is arranged in a serpentine fashion around pairs of waveguide elements as in FIG. 8; gap 808 would be made as small as possible. If element 804 is a set of rigid backplanes connected with flexible circuit dements, such arrangement into pairs is not necessary.

Figure 9:
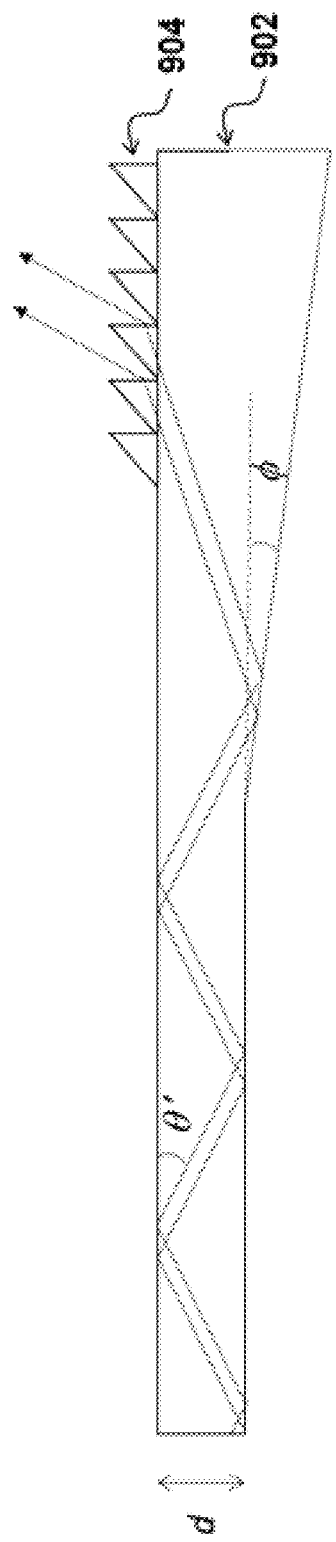
FIG. 9 is a schematic cross-sectional side view of another waveguide device for a three-dimensional display according to an embodiment of the present invention.

FIG. 9 shows a display according to yet another embodiment of the invention in which the viewing window is extended in the "y" dimension by providing a flare in the waveguide 902, i.e., providing a waveguide that is wedge shaped in the region of the out-coupling prismatic (or other)

elements 904. As shown in FIG. 9, light is propagating within the waveguide at an angle θ' with respect to the plane of the waveguide (this being the complementary angle to the angle of incidence of the light mentioned above), and in the wedge shaped portion the waveguide has a flare angle of φ, the flare preferably being provided on the opposite side of the waveguide to that bearing the out-coupling elements 904. Whereas, in the absence of a flare, the viewing window has length 2d/tan θ', where d is the thickness of the waveguide, the length of this window can be magnified when a flare is provided. The degree of magnification depends upon the angle θ' for a given angle φ. It is preferred that φ be in the range of about 5-12 degrees.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

All of the contents of the aforementioned patents and applications are incorporated by reference herein in their entireties.

What is claimed is:

1. An apparatus for a three-dimensional display comprising:
    a waveguide having a pair of opposed faces configured to propagate radiation along a length of the waveguide between the faces;
    a radiation source optically coupled to the waveguide and configured to transmit the radiation to a portion of a face of the waveguide;
    at least one light-transmissive prismatic element having a face optically coupled to at least one of the faces of the waveguide, the face of the light-transmissive prismatic element having a perimeter; and
    a layer of image modulating material optically coupled to an area of at least one of the faces of the waveguide, at least a portion of the area being located outside the perimeter of the face of the light-transmissive prismatic element;
    wherein radiation propagated through the waveguide exits the apparatus by passing through the light-transmissive prismatic element to form the three-dimensional display, and
    wherein the portion of the face of the waveguide optically coupled to the radiation source is located outside the perimeter of the face of the light-transmissive prismatic element.

2. The three-dimensional display apparatus of claim 1, wherein the entire area of the at least one face of the waveguide optically coupled to the layer of image modulating material is outside and adjacent to the perimeter of the face of the light-transmissive prismatic element.

3. The three-dimensional display apparatus of claim 1, wherein the radiation source is an emissive display.

4. The three-dimensional display apparatus of claim 1 comprising a plurality of prismatic elements forming an array of faces optically coupled to at least one of the faces of the waveguide, the array of faces of the light-transmissive prismatic elements forming the perimeter.

5. The three-dimensional display apparatus of claim 1, wherein the layer of image modulating material comprises a plurality of independently modulated regions.

6. The three-dimensional display apparatus of claim 1 comprising a first and second layer of image modulating material, the first layer of image modulating material being optically coupled to one of opposing faces of the waveguide, and the second layer of image-modulating material being optically coupled to the other opposing face of the waveguide.

7. The three-dimensional display apparatus of claim 1, wherein the image modulating material comprises a fluorescent material.

8. The three-dimensional display apparatus of claim 1, wherein the image-modulating material comprises a liquid crystal material.

9. The three-dimensional display apparatus of claim 1, wherein the image-modulating material comprises a plurality of charged particles and a suspending fluid, and the charged particles move through the suspending fluid under the influence of an electric field.

10. The three-dimensional display apparatus of claim 1, wherein the image-modulating medium comprises an electrochromic material.

11. An apparatus for a three-dimensional display comprising:
    a waveguide having a pair of opposed faces configured to propagate radiation along a length of the waveguide between the faces;
    a radiation source optically coupled to the waveguide and configured to transmit the radiation to a portion of a face of the waveguide;
    at least one light-transmissive prismatic element having a face optically coupled to at least one of the faces of the waveguide; and
    a layer of image modulating material optically coupled to at least one of the faces of the waveguide;
    wherein the waveguide is between the layer of image modulating material and the at least one light-transmissive prismatic element, and wherein radiation propagated through the waveguide exits the apparatus by passing through the light-transmissive prismatic element to form the three-dimensional display.

12. The three-dimensional display apparatus of claim 11, wherein the radiation source is an emissive display.

13. The three-dimensional display apparatus of claim 11 comprising a plurality of light-transmissive prismatic elements forming an array of faces optically coupled to at least one of the faces of the waveguide.

14. The three-dimensional display apparatus of claim 11, wherein the layer of image modulating material comprises a plurality of independently modulated regions.

15. The three-dimensional display apparatus of claim 11 further comprising second layer of image modulating material optically coupled to the same face of the waveguide as the at least one light-transmissive prismatic element.

16. The three-dimensional display apparatus of claim 15, wherein the second layer of image modulating material comprises a plurality of independently modulated regions.

17. The three-dimensional display apparatus of claim 11 further comprising a second waveguide optically coupled to the layer of image modulating material, wherein the layer of image modulating material is between the first and second waveguide.

18. The three-dimensional display apparatus of claim 11, wherein the image modulating material comprises a fluorescent material.

19. The three-dimensional display apparatus of claim 11, wherein the image modulating material comprises a liquid crystal material.

20. The three-dimensional display apparatus of claim 11, wherein the image modulating material comprises a plurality of charged particles and a suspending fluid, and the charged particles move through the suspending fluid under the influence of an electric field.

21. The three-dimensional display apparatus of claim 11, wherein the image modulating material comprises an electrochromic material.

* * * * *